Patented May 15, 1951

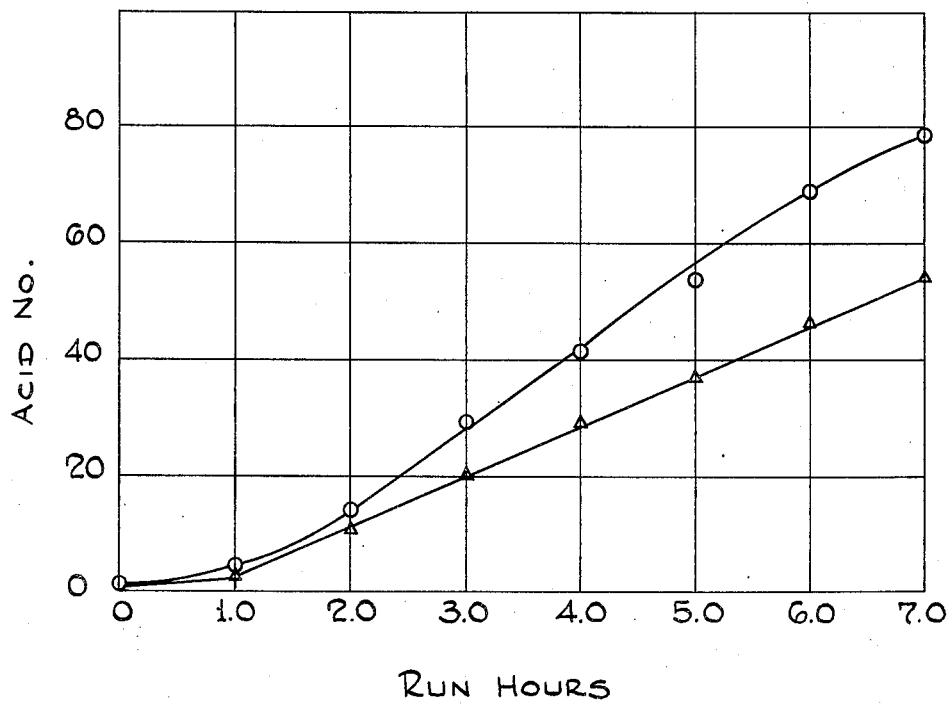

2,553,364

UNITED STATES PATENT OFFICE 2,553,364

OXIDATION PROCESS TO FORM FREE FATTY ACIDS

Egi V. Fasce, Baton Rouge, La., assignor to Standard Oil Development Company, a corporation of Delaware Application June 24, 1948, Serial No. 34,926

3 Claims. (Cl. 260—413)

This invention relates to an improved oxidation process for oxidizing synthetic organic products formed by hydrocarbon synthesis reactions and the oxo synthesis reactions.

It has been observed that the oxidation of synthetic organic products formed from carbon monoxide and hydrogen is very difficult and is characterized by a slow oxidation rate requiring very long times. These excessive time intervals necessary for the oxidation are undesirable for several reasons, i. e., undesirable esters are formed; gums tend to be deposited; polymerization and condensation reactions occur which give undesirable colors and odors to the product; and separation of unoxidized charged materials from the products is quite difficult.

This applies to the oxidation of synthetic olefinic hydrocarbons obtained by the Fischer synthesis from carbon monoxide and hydrogen over catalysts containing iron group metals such as iron, nickel, cobalt, etc. It also applies to products of the so-called oxo synthesis, which are formed by reaction of carbon monoxide and hydrogen with added olefins over catalysts of metals similar to those used in the hydrocarbon synthesis reaction but preferably cobalt. These oxo synthesis products include the aldehydes which are the initial reaction products of the olefin with carbon monoxide and hydrogen, and also the alcohols which may be obtained by the reduction of such aldehydes.

It has now been found that oxidation of both of the before-mentioned types of synthetic organic products is greatly improved and accelerated by subjecting these products to treatment with dilute aqueous mineral acids, preferably of a strength insufficient to cause oxidation or polymerization of the materials being treated. In addition, the oxidation of a mixture of the before-mentioned products is also facilitated by the process of this invention. This is extremely important as the products of the before-mentioned synthesis reactions are usually complex mixtures rather than relatively pure products. It is to be understood that whenever the term organic product from the synthesis reactions is used hereafter, it refers either to the olefins, alcohols, aldehydes or any possible mixture of these products derived from either or both of the preceding type reactions.

It is also desirable, following this acid treatment, to subject the synthetic organic materials to further treatment with an aqueous media such as water or alkali and water, to remove traces of the mineral acids and any derivatives derived therefrom. This treatment desirably also removes any organic acidic materials, including phenols, found in the products of the synthesis reaction.

The improved oxidation process of this invention is applicable to substantially all the synthetic olefins, aldehydes, and alcohol products of the hydrocarbon synthesis and oxo reactions. Such products have been prepared over the range from ethylene and its derivatives up to those of more than thirty carbon atoms per molecule. Where such products are normally solid, they are suitably subjected to the acid and alkali treatments described herein by first dissolving them in suitable, preferably inert, solvents such as petroleum ether or naphtha. These diluents are preferably removed by distillation before the oxidation step.

The oxidation of such products may be conducted according to known methods with air, oxygen, hydrogen peroxide, or other oxidizing agents. When using molecular oxygen-containing gases the oxidation is preferably conducted in the presence of suitable catalysts such as the oxides and salts or soaps of manganese, copper, cobalt, and other well known oxidation catalysts. Examples of these are cobalt oleate, manganese oleate, cobalt stearate, copper stearate, cobalt naphthenate and the like. Such catalysts are ordinarily used in small amounts not greater than a few per cent by weight of the material treated and are usually soluble therein. For example, manganese oleate may be used in concentration as low as .1% or less, and generally .2 to .5% is considered as the optimum concentration. Higher amounts are not objectionable technically but are often uneconomical. The oxidation in the presence of such catalysts with air or pure oxygen is conducted at from room temperature or less up, e. g., 0 to about 100–200° C. The oxidation is conducted for a period of time sufficient to obtain the desired degree of oxidation. This time varies according to temperature and feed stock and is generally from three or four hours or less up to about twenty-four hours or longer for a commercial process. The oxidation can be conducted as a batch process or on a continuous scale as desired and is usually done as a liquid phase process.

The general and preferred type oxidation process is as follows:

Air is admitted through a porous diaphragm or fritted plate in order to induce a frothy condition in the material being oxidized which is in the liquid phase. A portion of the reacting material may be recirculated through an external heat exchanger for temperature control. Either dissolved catalysts or solid catalysts fixed in place with fluid passing over them may be used.

The acid treatment of the crude synthetic products according to the present invention may be conducted for example with an equal volume of aqueous sulfuric acid of about 5 wt. per cent strength. Weaker acids may also be used but entail extra expense due to the larger volume necessitated and the more severe mixing condition required. Similarly, aqueous hydrochloric acid of about 5% is suitable and weaker or stronger acids up to about 10% or more may also be used without objectionable polymerization or HCl addition to any olefinic linkages present. With nitric acid somewhat more dilute concentrations are required in order to avoid oxidation and a strength of generally not more than 1 to 2% should be used. Dilute phosphoric acids of strength up to about 10% may also be employed. Other dilute mineral acids and organic acid derivatives of such acids such as benzene sulfonic acid and chlorosulfonic acid may be used, also, although the cheaper mineral acids such a sulfuric, hydrochloric, and nitric may be preferred. This dilute acid treatment of the crude products can be conducted at any suitable temperature above the melting point of the materials or solutions involved and may be conducted at higher temperatures up to those involving excessive oxidation, polymerization, or other reactions of the crude products. Generally, temperatures from about 16° to 38° C. are suitable.

This invention will be better understood by reference to the following examples. The crude synthetic products described below were treated with equal volumes of 5% aqueous sulfuric acid at room temperature followed by two washings. The treated materials were then subjected to oxidation under the conditions shown in the table. Samples of the product were removed and inspected hourly over a period of seven hours for acid numbers, a measure of oxidation. The results of the inspections are also given in the table and indicate that in each case the acid treated product oxidized much more rapidly than the crude product.

The crude synthetic raw materials were as follows: (I) A 204–232° C. olefin distillate fraction of crude synthetic hydrocarbons obtained by synthesis from carbon monoxide and hydrogen over an iron type catalyst at 400 pounds' pressure and reaction temperature of 288–316° C. This fraction had been washed with aqueous caustic and water to remove the organic acid constituents. These were largely $C_{12}$–$C_{13}$ olefines. (II) The second feed stock represents an oxo aldehyde product prepared from a fraction similar to the preceding hydrocarbon fraction I by treatment for five hours with 1.1/1 ratio of carbon monoxide to hydrogen at 3000 pounds' pressure and temperatures of 177° C. employing approximately 6.1% cobalt on silica gel as catalyst. These were largely $C_{13}$–$C_{14}$ oxo aldehydes. (III) Example No. III represents the alcohol product prepared from the preceding type oxo aldehyde by hydrogenation with hydrogen over 13.4 weight per cent of nickel catalyst for twelve hours at 177° C. and 2700 p. s. i. g. These were largely $C_{13}$–$C_{14}$ oxo alcohols.

*Table*

| | I Olefin Fraction | | II Oxo Aldehyde | | III Oxo Alcohol | |
|---|---|---|---|---|---|---|
| | No Acid Treat | After 5% $H_2SO_4$ Treat | No Acid Treat | After 5% $H_2SO_4$ Treat | No Acid Treat | After 5% $H_2SO_4$ Treat |
| OH No. | | | | 12 | 144 | 139 |
| CO No. | | | | 180 | 3 | 7 |
| Sap. No. | | | | 51 | 28 | 29 |
| Acid No. | 0.0 | 0.0 | 0.7 | | 0.4 | 0.3 |
| Oxidation Conditions: | | | | | | |
| Charge, Gms. | 250 | 100 | 200 | 164 | 250 | 138 |
| Air Rate, L./Hr./100 Gms. Charge | 17 | 43 | 21 | 26 | 17 | 31 |
| Temp., °C. | 119 | 128 | 122 | 122 | 121 | 124 |
| Length of Run, Hrs. | 6 | 7 | 6 | 7 | 6 | 7 |
| Cat., Wt. Per Cent | | | 0.2% Cobalt Oleate | | | |
| Acid No. of Product Hrs.: | | | | | | |
| 1.0 | 1.9 | 4.7 | 3.0 | 3.9 | 0.7 | 0.3 |
| 2.0 | 7.9 | 19.9 | 11.2 | 14.0 | 1.1 | 0.4 |
| 3.0 | 13.9 | 32.6 | 19.3 | 29.4 | 9.3 | 5.3 |
| 4.0 | 22.8 | 55.4 | 29.4 | 41.4 | 18.5 | 18.5 |
| 5.0 | 34.0 | | 37.2 | 54.1 | 26.2 | 32.5 |
| 6.0 | 42.0 | 61.2 | 44.0 | 69.0 | 34.2 | 50.1 |
| 7.0 | | 61.2 | | 79.0 | | 68.0 |

It can be seen from the acid numbers of the products obtained that the latter are quite similar regardless of the starting material. This illustrates the adaptability of the process of this invention for the oxidation of an organic mixture from a hydrocarbon synthesis reaction.

The effect of acid treating of an oxo aldehyde feed on the oxidation rate is shown graphically in the figure in which are plotted the change in acid number with time.

The improved oxidation rate is readily apparent from inspection of the preceding table and figure.

In general therefore the preferred oxidation conditions are a time interval of about from one to seven hours at a temperature of about from 100 to 200° C.

Generally speaking, the oxidation product contains monobasic, saturated fatty acids containing from two to twenty or more carbon atoms, depending upon the nature of the charge to the process. There are also some esters present in the crude oxidation product.

Upon oxidation, the olefin molecule splits at the double bond. Depending upon the substituents on the terminal carbon attached to the double bond, formaldehyde or acetaldehyde may be produced. The remainder of the carbon chain forms aldehydes which upon subsequent oxidation form acids. Alcohols are also produced, possibly by a Cannizzaro type of reaction.

The $C_{13}$, $C_{14}$ oxo aldehydes or oxo alcohols upon oxidation will form acids containing approximately the same number of carbon atoms as the starting material, as well as some lower molecular weight acids.

The lower acids (up to $C_{12}$) are used in chemical syntheses such as for the preparation of esters for solvents; the $C_6$–$C_{10}$ acids are used for the preparation of soaps to be used as driers in paints; the $C_{10}$–$C_{20}$ acids are used for the preparation of soaps, or for preparation of esters with high molecular weight alcohols for use as lube oil additives.

It is to be understood that the invention is not limited to the specific examples that have been offered merely as illustrations and that modifications may be made within the scope of the claims without departing from the spirit of the invention.

What is claimed is:

1. A process for the oxidation of an organic product comprising a mixture of olefins, alcohols, and aldehydes from a synthesis reaction wherein the reactants comprise an olefin, carbon monoxide and hydrogen, which comprises washing said organic product in the liquid phase with a dilute aqueous mineral acid, washing the thus acid treated organic product with an aqueous media to remove substantially all the acidic material contained therein and oxidizing the thus washed organic product in the liquid phase with air in the presence of a cobalt oleate catalyst at a temperature of from 0 to 200° C. for a time interval of from 1 to 7 hours.

2. A process for the preparation of organic acids from an organic product comprising a mixture of olefins, oxo alcohols and oxo aldehydes derived from a synthesis reaction wherein the reactants comprise an olefin, carbon monoxide and hydrogen which comprises washing said organic product in the liquid phase with a dilute aqueous mineral acid, washing the thus acid treated organic product with an aqueous media to remove substantially all the acidic material contained therein and oxidizing the thus washed organic product in the liquid phase with air in the presence of a cobalt oleate catalyst at a temperature of from 0 to 200° C. for a time interval of from 1 to 7 hours.

3. A process for the oxidation of an organic product comprising a mixture of olefins, alcohols, and aldehydes, the principal components being alcohols, said mixture being derived from a synthesis reaction wherein the reactants comprise an olefin carbon monoxide, and hydrogen, which comprises washing said organic product in the liquid phase with 5% sulfuric acid, washing the thus acid treated organic product with an aqueous media to remove substantially all the acidic material contained therein and oxidizing the thus washed organic product in liquid phase with air in the presence of a cobalt oleate catalyst at a temperature of 124° C. for a time interval of about 7 hours.

EGI V. FASCE.

REFERENCES CITED

The following references are of record in the file of this patent:

UNITED STATES PATENTS

| Number | Name | Date |
| --- | --- | --- |
| 2,415,102 | Landgraf et al. | Feb. 4, 1947 |

OTHER REFERENCES

"Interrogation of Dr. Otto Roelen," Hall et al., Hobart Publishing Co., Chevy Chase, Washington, D. C., published July 18, 1947, by O. T. S., pages 47–48.

Ser. No. 373,703, Martin (A. P. C.), published July 13, 1943.